(12) United States Patent
Pilkington et al.

(10) Patent No.: US 9,457,720 B2
(45) Date of Patent: Oct. 4, 2016

(54) DISPLAY DEVICE FOR A MOTOR VEHICLE

(71) Applicant: Bayerische Motoren Werke Aktiengesellschaft, Munich (DE)

(72) Inventors: Mark Pilkington, Munich (DE); Andreas Balwe, Munich (DE)

(73) Assignee: Bayerische Motoren Werke Akteingesellschaft, Munich (DE)

( * ) Notice: Subject to any disclaimer, the term of this patent is extended or adjusted under 35 U.S.C. 154(b) by 655 days.

(21) Appl. No.: 13/923,945

(22) Filed: Jun. 21, 2013

(65) Prior Publication Data

US 2013/0279140 A1    Oct. 24, 2013

Related U.S. Application Data

(63) Continuation of application No. PCT/EP2011/073591, filed on Dec. 21, 2011.

(30) Foreign Application Priority Data

Dec. 22, 2010 (DE) .................. 10 2010 063 969

(51) Int. Cl.
| | |
|---|---|
| H05K 7/02 | (2006.01) |
| B60R 1/00 | (2006.01) |
| B32B 17/10 | (2006.01) |
| B60K 35/00 | (2006.01) |

(52) U.S. Cl.
CPC .......... *B60R 1/00* (2013.01); *B32B 17/10036* (2013.01); *B32B 17/10174* (2013.01); *B32B 17/10761* (2013.01); *B60K 35/00* (2013.01); *B60K 2350/106* (2013.01); *B60K 2350/2086* (2013.01); *G02F 2201/50* (2013.01)

(58) Field of Classification Search
CPC ...................................... H05K 7/142
USPC ........................................... 361/807
See application file for complete search history.

(56) References Cited

U.S. PATENT DOCUMENTS

| | | |
|---|---|---|
| 4,768,300 A | 9/1988 | Rutili |
| 5,238,743 A | 8/1993 | Grolig et al. |
| 2003/0048194 A1 | 3/2003 | Wada |
| 2003/0107550 A1 | 6/2003 | Tuzar |
| 2007/0223187 A1* | 9/2007 | Chou et al. ............. 361/683 |
| 2010/0182761 A1* | 7/2010 | Suzuki et al. .......... 361/807 |
| 2012/0020046 A1* | 1/2012 | Takashima ............. 361/807 |

(Continued)

FOREIGN PATENT DOCUMENTS

| | | |
|---|---|---|
| DE | 32 18 010 C2 | 4/1989 |
| DE | 40 15 571 A1 | 11/1991 |

(Continued)

OTHER PUBLICATIONS

International Preliminary Report on Patentability (PCT/IB/373), including Written Opinion (PCT/ISA/237) dated Jun. 25, 2013 {Five (5) Pages}.

(Continued)

*Primary Examiner* — Forrest M Phillips
(74) *Attorney, Agent, or Firm* — Crowell & Moring LLP

(57) ABSTRACT

A display device for a motor vehicle, includes a display device housing, which is open at the front face and in which a display is arranged. A laminated safety glass panel, which is arranged in front of the front face of the display, is supported by the display device housing and/or the display.

15 Claims, 2 Drawing Sheets

(56) References Cited

U.S. PATENT DOCUMENTS

| | | | |
|---|---|---|---|
| 2012/0299809 A1* | 11/2012 | Fujii et al. | 345/102 |
| 2013/0242523 A1* | 9/2013 | Wallace et al. | 361/807 |
| 2013/0286624 A1* | 10/2013 | Lee et al. | 361/807 |
| 2014/0321094 A1* | 10/2014 | Kuo et al. | 361/807 |

FOREIGN PATENT DOCUMENTS

| | | |
|---|---|---|
| DE | 195 01 577 C1 | 3/1996 |
| DE | 199 21 402 A1 | 12/2000 |
| DE | 102 39 828 A1 | 3/2003 |
| DE | 101 60 749 A1 | 6/2003 |
| DE | 102 11 270 A1 | 10/2003 |
| DE | 10 2004 026 467 B4 | 1/2007 |
| DE | 20 2006 017 388 U1 | 3/2007 |
| DE | 10 2007 012 571 A1 | 1/2008 |
| GB | 2 119 729 A | 11/1983 |
| JP | 2008-139833 A | 6/2008 |

OTHER PUBLICATIONS

International Search Report dated May 2, 2012 with English translation (four (4) pages).

German Search Report dated Aug. 22, 2011 with English translation (ten (10) pages).

* cited by examiner

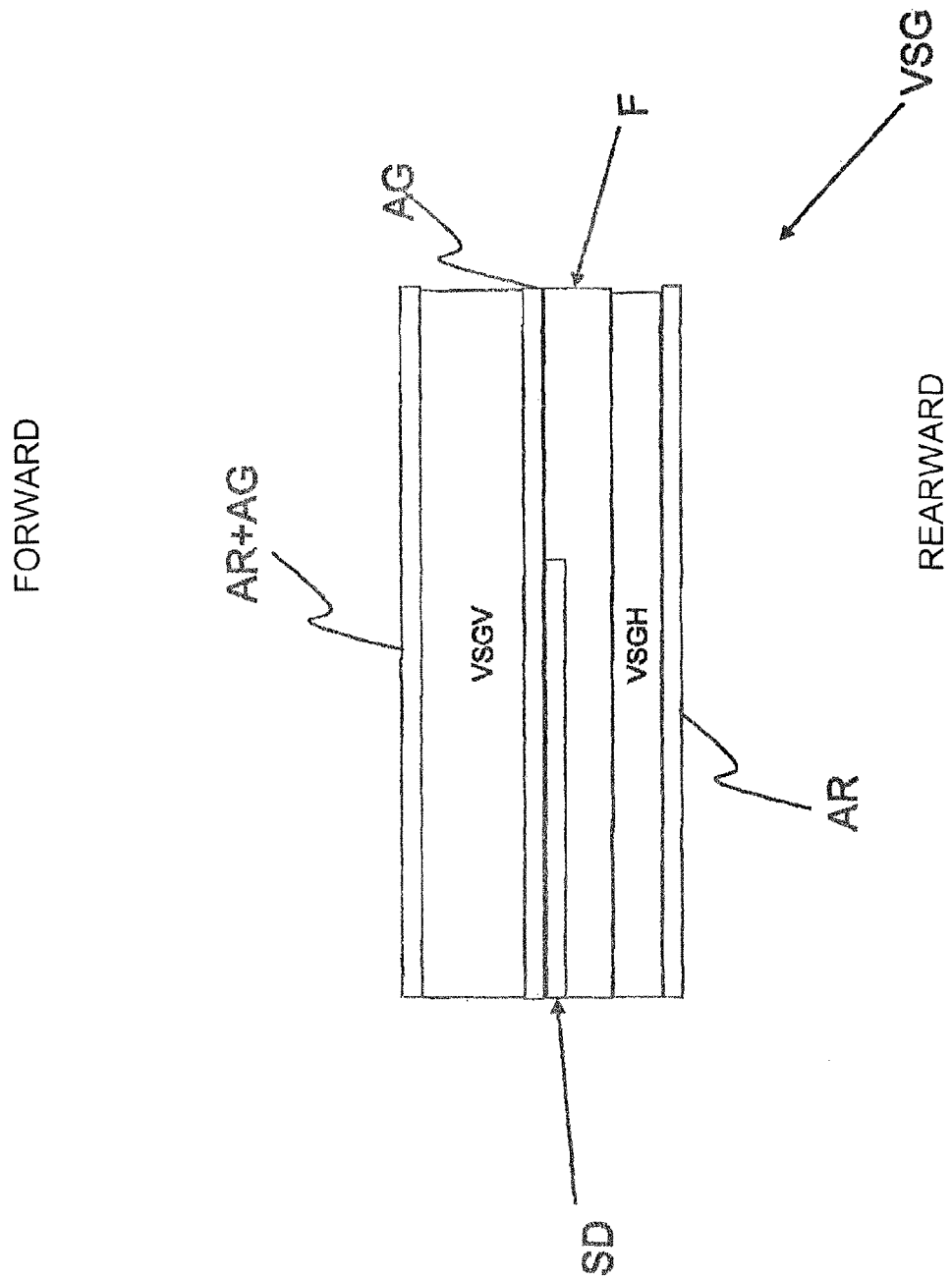

DISPLAY DEVICE FOR A MOTOR VEHICLE

CROSS REFERENCE TO RELATED APPLICATIONS

This application is a continuation of PCT International Application No. PCT/EP2011/073591, filed Dec. 21, 2011, which claims priority under 35 U.S.C. §119 from German Patent Application No. DE 10 2010 063 969.9, filed Dec. 22, 2010, the entire disclosures of which are herein expressly incorporated by reference.

BACKGROUND AND SUMMARY OF THE INVENTION

The invention relates to a display device and, more particularly, to a display device for a motor vehicle.

Many different types of display devices are known, particularly in the vehicle field. In addition to the good readability of information displayed on the display devices and the minimizing of manufacturing and integration expenditures, an attractive and aesthetic look of the individual or mutually combined display devices is at the center of the development efforts. More recent developments provide freestanding display devices. Here, it is important to achieve a light and graceful visual appearance of the display device which simultaneously meets the high safety requirements on a freestanding display device in a motor vehicle interior.

It is an object of the invention to improve upon display devices for motor vehicles known from the state of the art.

This and other objects are achieved by a display device for a motor vehicle having a display device housing, which is open at a front face and in which a display is arranged. A laminated safety glass panel, which is disposed in front of the display on the front face, is supported by the display device housing and/or the display.

A display device according to the invention, in particular, a freestanding display device for a motor vehicle, comprises a display device housing that is open at the front face. A display, such as an LCD display, is arranged in the display device housing. In addition, the display device has a laminated safety glass panel which is arranged in front of the display on the front face and which is supported indirectly or directly by the display device housing and/or the display.

A display device for a motor vehicle is thereby created which can be implemented in a freestanding manner in a motor vehicle and which can be designed in a light and graceful fashion and is safe nevertheless.

Comprehensive research, on which the invention is based and which was carried out specifically for this purpose, indicated that laminated safety glass is particularly advantageous for covering the open front face of the display device housing. During the research investigations, it was found that a covering made of alternative material, such as plastic (PMMA, PCMA, etc.) or of hardened safety glass is either too soft, does not meet crash test requirements (hardened safety glass), would result in panels that are too thick (hardened safety glass), cannot be used with polarized sunglass lenses (plastic materials) or would lead to excessive costs for the antireflection or antiglare layer (plastic materials). Only the use of a laminated safety glass panel was found to be suitable for the series and for the above-mentioned purpose.

It is a further development of the invention that the display has a display frame by which the laminated safety glass panel is supported.

It is another further development that the laminated safety glass panel is connected by way of an adhesive film, particularly a double-sided adhesive tape, with the display device housing and/or with the display. In a simple manner, this ensures a reliable fastening of the laminated safety glass panel.

According to another further development, the laminated safety glass panel has a forward glass panel, a rearward glass panel and a film situated in-between, particularly a PVB (polyvinyl butyral) film. As a result, the crash test demands and the readability demands on a display device for a motor vehicle can be met.

In order to improve the readability of the display device, according to a further development, the forward glass panel is coated on its front face with an antireflection layer AR or is implemented with it. This reduces the possible reflections of surrounding light sources.

The wording "the glass panel is coated with a layer or implemented with it", within the scope of the invention, also comprises a surface treatment of a glass panel by which the surface of the glass panel, for example, by way of a vaporization, an etching process, an immersion process, etc., is modified, particularly roughened such that the surface of the glass panel counteracts a reflection or a glaring in the same manner as, for example, a layer of a different material applied particularly for that purpose. The above-mentioned wording also includes the application of a corresponding film to the glass panel.

In order to further improve the readability of the display device, the forward glass panel is coated or implemented with an antiglare layer AG on the front face. As a result, possible reflections are thereby proportionally scattered into diffuse light at the surface of the glass.

In order to facilitate the production of the antiglare layer on the front face of the forward glass panel, the entire forward glass panel is preferably immersed in an immersion bath containing an etching liquid. The thereby unavoidably caused antiglare layer on the back side of the forward glass panel, within the scope of the invention, as a result of the film situated behind it, has no disturbing effect and is particularly not very dispersive.

In order to further improve the readability of the display device, the rearward glass panel is coated or implemented with an antireflection layer on the back side. This, in turn, reduces reflection losses within the display configuration which would otherwise occur, for example, because of the media transitions arising as a result of the configuration according to the invention.

The display device housing preferably has an interior (at least partially or completely circumferential) web by which the laminated safety glass panel is supported. The web is preferably set back with respect to the forward edge of the display device housing, so that the laminated safety glass panel is framed and protected by the forward edge of the display device housing. In this case, the display device housing forms a frame surrounding the laminated safety glass plate.

Preferably, the housing cutout formed by the circumferential web and/or the forward edge of the display device housing corresponds to the shape of the laminated safety glass panel. For example, both shapes are essentially implemented as rectangles with essentially identical dimensions.

According to an aesthetically particularly attractive embodiment, a black print is implemented circumferentially at the edge on the film or on a glass panel of the laminated safety glass plate, by means of which black print, the web situated behind it, the frame of the display situated behind it, the adhesive tape situated behind it will be covered, so that they are not visible to an occupant of the vehicle. Advantageously, the black print is implemented such that, through the laminated safety glass panel, 100%, more than 95% or more than 90% of the display surface usable for the information display remains visible.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a schematic representation of a part of a laminated safety glass panel.

DETAILED DESCRIPTION OF THE DRAWINGS

Figure 1:
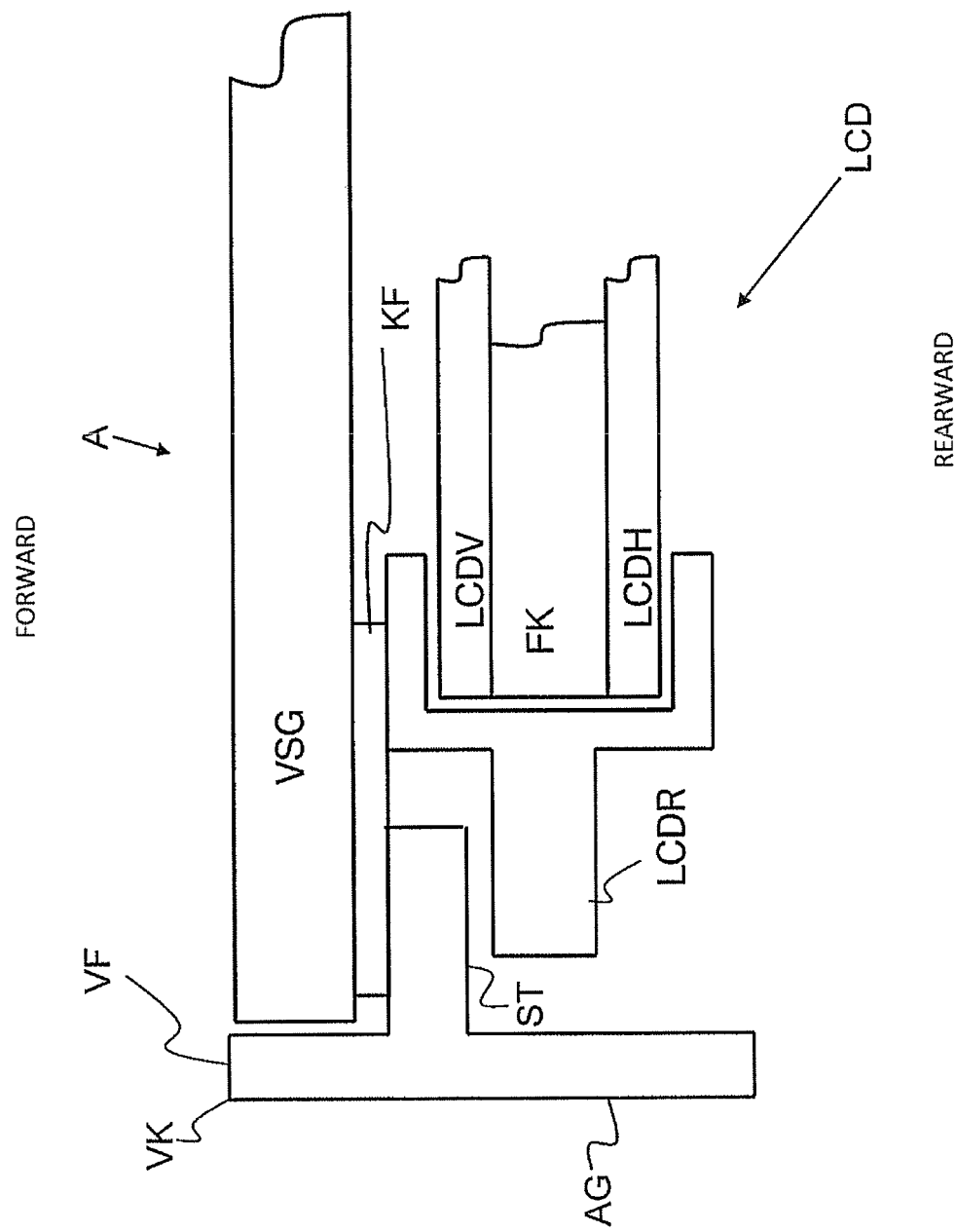
FIG. 1 is a schematic sectional view of a part of a display device.

FIG. 1 is a schematic sectional view of a part of the display device A for a motor vehicle. A display device housing AG is illustrated which contains an LCD display LCD.

The LCD display LCD, which is known per se, constructively includes essentially a forward LCD panel LCDV, a rearward LCD panel LCDH, a liquid crystal layer FK situated in-between and an LCD frame LCDR by which the above-mentioned components are held together and supported. The forward LCD panel LCDV is equipped on its front face with an antiglare layer AG and an antireflection layer AR.

Further components of the LCD display LCD, such as a backlighting or the LCD electronic system, are not shown because they play no role in understanding the invention.

The LCD display LCD and/or the display device housing AG are preferably supported by a metal frame (not shown) which itself is mechanically connected with the motor vehicle, particularly the dashboard, in such a manner that the display device A is supported by the dashboard in a free-standing manner.

The LCD display LCD and the display device housing AG are mechanically connected with one another directly and/or by way of the metal frame.

The display device housing AG is implemented such that a front edge VK is formed at the front face. The front edge VK extending around the front face of the display device housing AG, possibly together with a circumferential front face surface VF extending in the direction of the front face center, forms a frame for the laminated safety glass panel VSG. Set back with respect to the front edge VK or the front face surface VF, a circumferential web ST is formed on the interior side of the display device housing AG by the display device housing AG, by which web ST the laminated safety glass panel VSG is supported.

The laminated safety glass panel VSG forms essentially the front face of the display device A and simultaneously closes off the display device housing AG that is open toward the front. The laminated safety glass panel VSG, the LCD frame and the display device housing AG are connected with one another by an adhesive film KF, particularly a double-sided adhesive tape, such that the laminated safety glass panel VSG is supported.

The laminated safety glass panel VSG and the display device housing AG are implemented such that the housing cutout formed by the circumferential web ST, the circumferential front face surface VF and/or the front edge VK of the display device housing AG correspond to the shape of the laminated safety glass panel VSG, so that a frame that surrounds the laminated safety glass panel VSG is formed by the display device housing AG.

In the following, the laminated safety glass panel VSG will be described with reference to FIG. 2. The laminated safety glass panel VSG has a forward glass panel VSGV and a rearward glass panel VSGH, as well as a PVB (polyvinyl butyral) film F situated in-between.

A circumferential black print SD on the edge is implemented on the film F or on one of the glass panels VSGV, VSGH of the laminated safety glass panel VSG such that, by means of the black print SD, the web ST, the adhesive tape KF and/or the frame LCDR are covered so as not to be visible to a user in front of the display device A.

In this case, the forward glass panel VSGV is coated on its front face with an antireflection layer AR known per se and with an antiglare layer AG also known per se, and, on its back side, is also coated with an antiglare layer AG known per se. The rearward glass panel VSGH is coated with an antireflection layer AR on the back side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display device for a motor vehicle, comprising:
   a display;
   a display device housing configured to house the display, the display device housing having a first wall and a second wall opposing the first wall and having an opening at a front face; and
   a laminated safety glass panel disposed in front of the display on the front face of the display device housing, the laminated safety glass panel being supported by at least one of the display device housing and the display, and
   wherein the display device housing comprises a first interior circumferential web disposed on the first wall and arranged behind the laminated safety glass panel, and a second interior circumferential web disposed on the second wall and arranged behind the laminated safety glass panel, and wherein the laminated safety glass panel is supported by the display device housing via the first and second circumferential webs.

2. The display device according to claim 1, further comprising:
   a display frame in which the display is arranged; and
   wherein the laminated safety glass panel is supported by the display frame.

3. The display device according to claim 1, wherein the laminated safety glass panel is connected by an adhesive film with said at least one of the display device housing and the display.

4. The display device according to claim 3, wherein the adhesive film is a double-sided adhesive tape.

5. The display device according to claim 1, wherein the laminated safety glass panel comprises a forward glass panel, a rearward glass panel and a film arranged between the forward glass panel and the rearward glass panel.

6. The display device according to claim 5, wherein the film is a polyvinyl butyral film.

7. The display device according to claim 5, wherein the forward glass panel is implemented with an antireflection layer on a front face thereof.

8. The display device according to claim 5, wherein the forward glass panel is implemented with an antiglare layer on a front face thereof.

9. The display device according to claim 5, wherein the forward glass panel is implemented with both an antireflection layer and an antiglare layer on a front face thereof.

10. The display device according to claim 9, wherein the forward glass panel is implemented with an antiglare layer on a backside thereof.

11. The display device according to claim 5, wherein the forward glass panel is implemented with an antiglare layer on a backside thereof.

12. The display device according to claim 5, wherein the rearward glass panel is implemented with an antireflection layer on a backside thereof.

13. The display device according to claim 10, wherein the rearward glass panel is implemented with an antireflection layer on a backside thereof.

14. The display device according to claim 1, wherein the laminated safety glass panel comprises a black print extending about a circumferential edge of the laminated safety glass panel, and
   wherein the black print is dimensioned so as to cover one or more of the first and second interior circumferential webs when viewed from the front face of the display device housing.

15. The display device according to claim 1, wherein the display device housing is configured to form a frame surrounding a lateral edge of the laminated safety glass panel.

\* \* \* \* \*